US005481990A

United States Patent [19]
Zacharias

[11] Patent Number: 5,481,990
[45] Date of Patent: Jan. 9, 1996

[54] AIR DRILL APPARATUS

[75] Inventor: Victor Zacharias, Altona, Canada

[73] Assignee: Tor-Master Mfg. Ltd., Altona Manitoba, Canada

[21] Appl. No.: 208,150

[22] Filed: Mar. 10, 1994

[51] Int. Cl.$^6$ .................................................. A01C 5/06
[52] U.S. Cl. .......................................... 111/174; 111/173
[58] Field of Search .................................. 111/134, 135, 111/136, 137, 167, 168, 195, 196, 173, 174, 175

[56] References Cited

U.S. PATENT DOCUMENTS

| | | | |
|---|---|---|---|
| 3,177,830 | 4/1965 | Zimmerman | 111/135 X |
| 4,031,834 | 6/1977 | Klenke | 111/163 X |
| 4,273,057 | 6/1981 | Pollard | 111/195 X |
| 4,307,674 | 12/1981 | Jennings et al. | 111/136 X |
| 4,760,806 | 8/1988 | Bigbee et al. | 111/87 |
| 4,846,084 | 7/1989 | Sigle | 111/136 |
| 5,074,227 | 12/1991 | Suhwitters | 111/137 |
| 5,081,942 | 1/1992 | Clark et al. | 111/136 |
| 5,092,255 | 3/1992 | Long et al. | 111/167 |

Primary Examiner—Henry E. Raduazo
Assistant Examiner—Robert Pezzuto
Attorney, Agent, or Firm—Jones, Tullar & Cooper

[57] ABSTRACT

Air drill apparatus for towing behind a tractor and for placing seed or other particulate material in the ground includes wheeled implement mounting bars adapted to be towed behind the tractor, a plurality of air drill assemblies mounted to the implement mounting bars, and a wheeled towed container for the seed or other particulate material to be placed in the ground, the container including a pump for creating a positive air pressure to drive seed or other particulate material therefrom to the air drill assemblies. Each air drill assembly includes an arm pivotally connected to the mounting bar; a thin, circumferentially sharp disc wheel rotatably mounted to the arm at slight angles to the vertical and the direction of travel for cutting a narrow furrow in the ground; a seed boot connected to the container and mounted to the arm adjacent the disc wheel and the ground for depositing seed or other particulate material in the furrow; a seed lock wheel mounted to the arm adjacent and behind the disc wheel for pushing deposited seed or other particulate material deeper into the furrow; and an adjustable depth control wheel mounted to the arm for controlling the depth of furrow cut by the disc wheel.

17 Claims, 6 Drawing Sheets

AIR DRILL APPARATUS

The present invention relates generally to apparatus for placing seeds or other particulate material in the ground and, in particular, to apparatus operating with air pressure to drive seed or other particulate material into a very narrow furrow cut into the ground.

BACKGROUND AND SUMMARY OF THE INVENTION

There is a need for planting apparatus which will efficiently and effectively deposit seeds or other particulate material such as fertilizers, insecticides and/or herbicides in the ground without requiring tilling of the ground prior to planting. Ground covered by stubble from previous crops is conveniently tilled before replanting and this is a time-consuming and expensive process. Considerable savings can be realized if such fields can be planted without pre-tilling.

There have been attempts in the past to create equipment that will achieve the aforementioned results. Single disc openers appear in U.S. Pat. Nos. 1,940,273; 2,869,489; 2,920,587; and 4,031,834 and in Canadian Patent No. 1,294,177. Each of these openers and planters operates on the principle of cutting a thin furrow in the ground, planting seed and/or fertilizer in the furrow and then closing the furrow thereafter. The structure and operation of these devices has left much to be desired when it comes to efficiency and cost of construction and operation.

The present invention overcomes the problems of the prior art by providing apparatus that will effectively and simultaneously cut a narrow (about 1⅓" wide) furrow in the ground to a controlled depth, drive seed or other particulate material under air pressure into the furrow just created, tamp the deposited material firmly into the earth, and then close the furrow as the apparatus moves along. A plurality of parallel furrows can be created and planted by mounting a corresponding plurality of the air drill assemblies of the invention to laterally extending implement mounting bars which are towed behind a tractor. The width of the implement mounting bars is determined only by the towing capacity of the tractor and the size of the field to be planted. Folding mounting bars can be used for very wide applications.

In its broadest form the present invention may be considered as providing air drill apparatus for towing behind a tractor and for placing seed or other particulate material in the ground, comprising: wheeled implement means adapted to be towed behind the tractor, the implement means including at least one transversely extending implement mounting bar; at least one air drill assembly mounted to the implement mounting bar; and container means for the seed or other particulate material to be placed in the ground, the container means including means for creating a positive air pressure to drive seed or other particulate material therefrom to the air drill assembly. The air drill assembly comprises: arm means pivotally connected to the mounting bar; thin, circumferentially sharp disc wheel means rotatably mounted to the arm means at a slight angle to the vertical and at a slight angle to the direction of travel for cutting a narrow furrow in the ground; seed boot means connected to the container means and mounted to the arm means adjacent the disc wheel means and the ground for depositing seed or other particulate material in the furrow; seed lock wheel means mounted to the arm adjacent and behind the disc wheel means for pushing deposited seed or other particulate material deeper into the furrow; and adjustable depth control wheel means for controlling the depth of furrow cut by the disc wheel means, the depth control means being rotatably mounted to one end of a journal member the other end of which is rotatably mounted to the arm means, the journal member including, extending upwardly therefrom, an arcuate portion having a series of equally spaced apart notches therein, the arm means carrying a housing with at least one reciprocable latch member therein, the latch member being engageable with a selected one of the notches to adjust the position of the depth control wheel means relative to the disc wheel means.

DESCRIPTION OF THE PREFERRED EMBODIMENT

Figure 1:
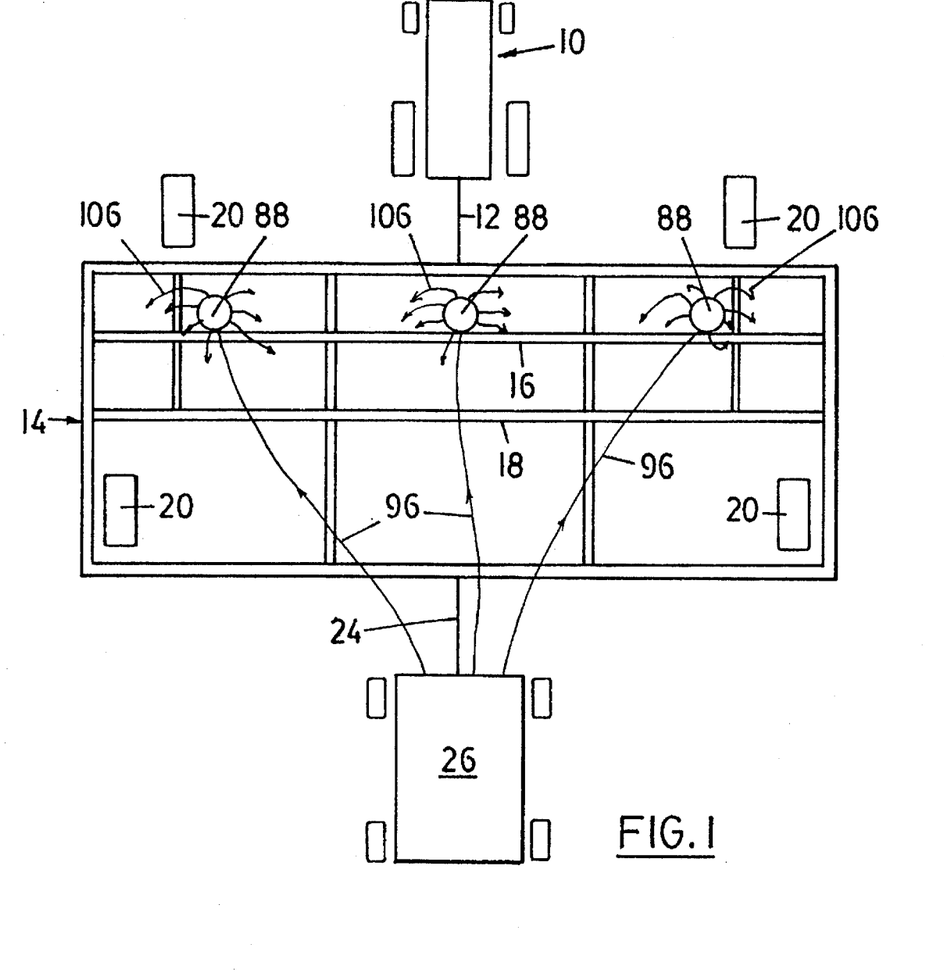
FIG. 1 is a plan view of a schematic representation of the apparatus relating to the present invention.

FIG. 1 illustrates in plan view the general apparatus to which the present invention pertains, without details of the air drill assembly per se being shown. In FIG. 1 there is seen a tractor 10 with a pivotable tow bar 12 leading to implement means 14 which includes, as shown, a frame incorporating leading and trailing implement mounting bars 16, 18. The frame is supported through a parallel linkage (not shown) by wheels 20, the front ones of which are castored. By using the parallel linkage the frame can be raised or lowered as a unit relative to the ground, either for transport or to increase the downwards force applied to the disc wheels of the air drill assemblies.

A pivotable rear tow bar 24 connects the frame or implement means 14 to wheeled container means 26. Container means 26 is adapted to contain the material to be planted and may be divided into compartments to contain seed, fertilizer, insecticide and/or herbicide. The container means also includes a fuel-driven motor which in turn drives an air compressor to pressurize the compartment(s) within the container means so as to move the compartment contents towards the air drill assembly of the invention.

Figure 2:
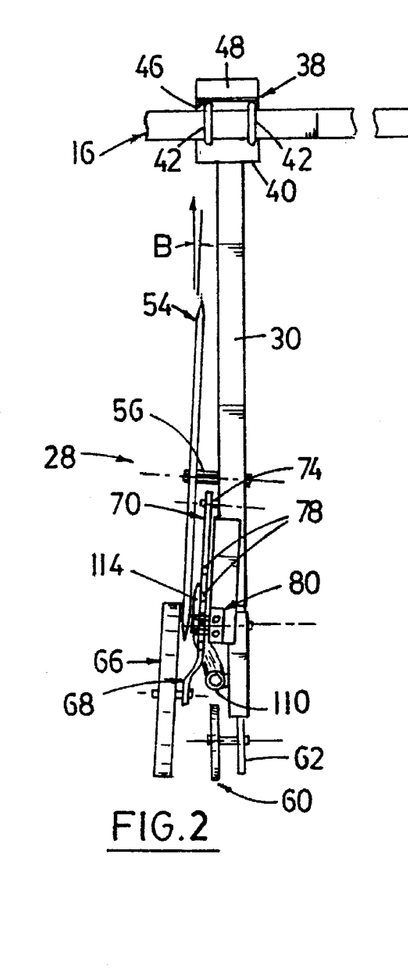
FIG. 2 is a plan view of one form of the apparatus of the invention.
Figure 3:
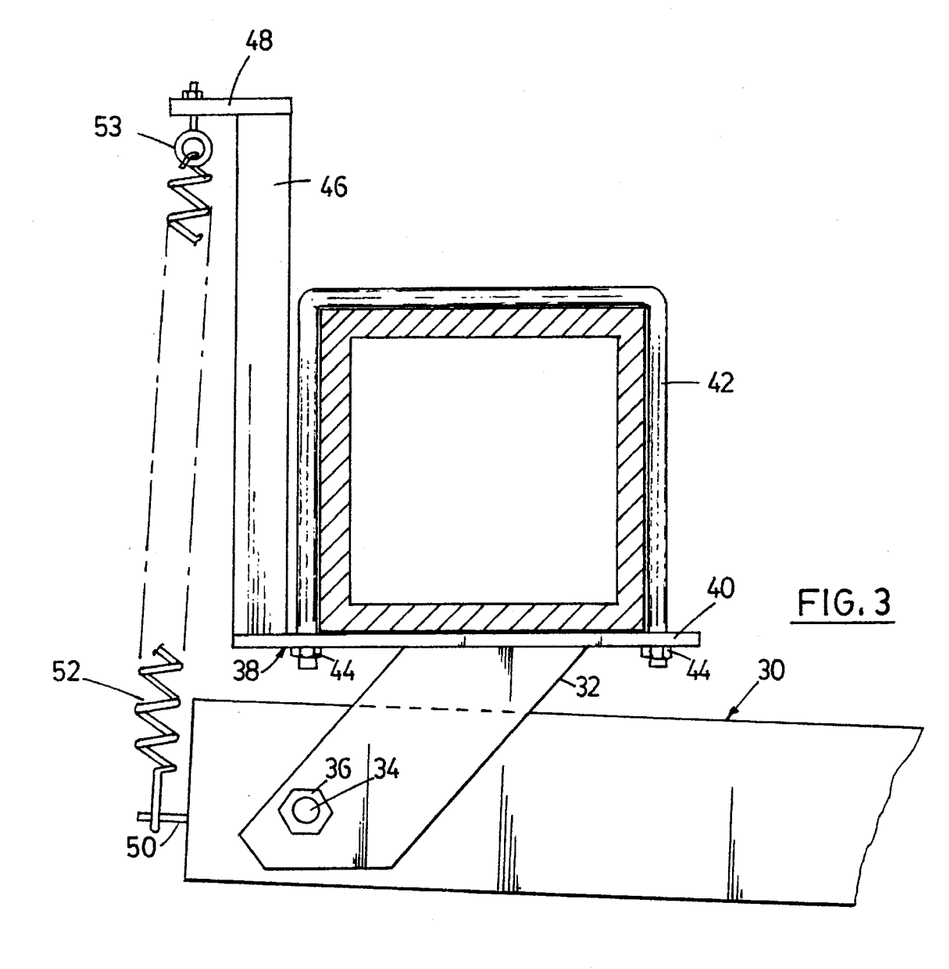
FIG. 3 is an enlarged partial section of the mounting of the air drill apparatus to an implement mounting bar.

The present invention involves the installation on each of the implement mounting bars of a plurality of air drill assemblies of the present invention. FIG. 2 shows one such assembly 28 in plan view, there being a mounting arm 30 pivotally connected to the bar 16 by way of mounting lugs 32, threaded shaft 34 and end nuts 36 (FIG. 3). The mounting lugs 32 are part of an L-shaped bracket 38, the horizontal leg 40 of which abuts the bottom wall of the bar 16. U-bolts 42 are placed over the bar 16 and are secured to the leg 40 by nuts 44. The vertical leg 46 of the bracket is located at the front of the bar 16 and includes a forwardly extending flange 48. The forward end of the arm 30 includes a forwardly extending bar or flange 50 for attachment thereto of one end of a pair of tension springs 52, the opposite ends of which are connected to the flange 48 via a corresponding pair of adjustable eyebolts 53. The springs 52 apply a force to the arm 30 so as to bias it downwards towards the ground.

Figure 4:
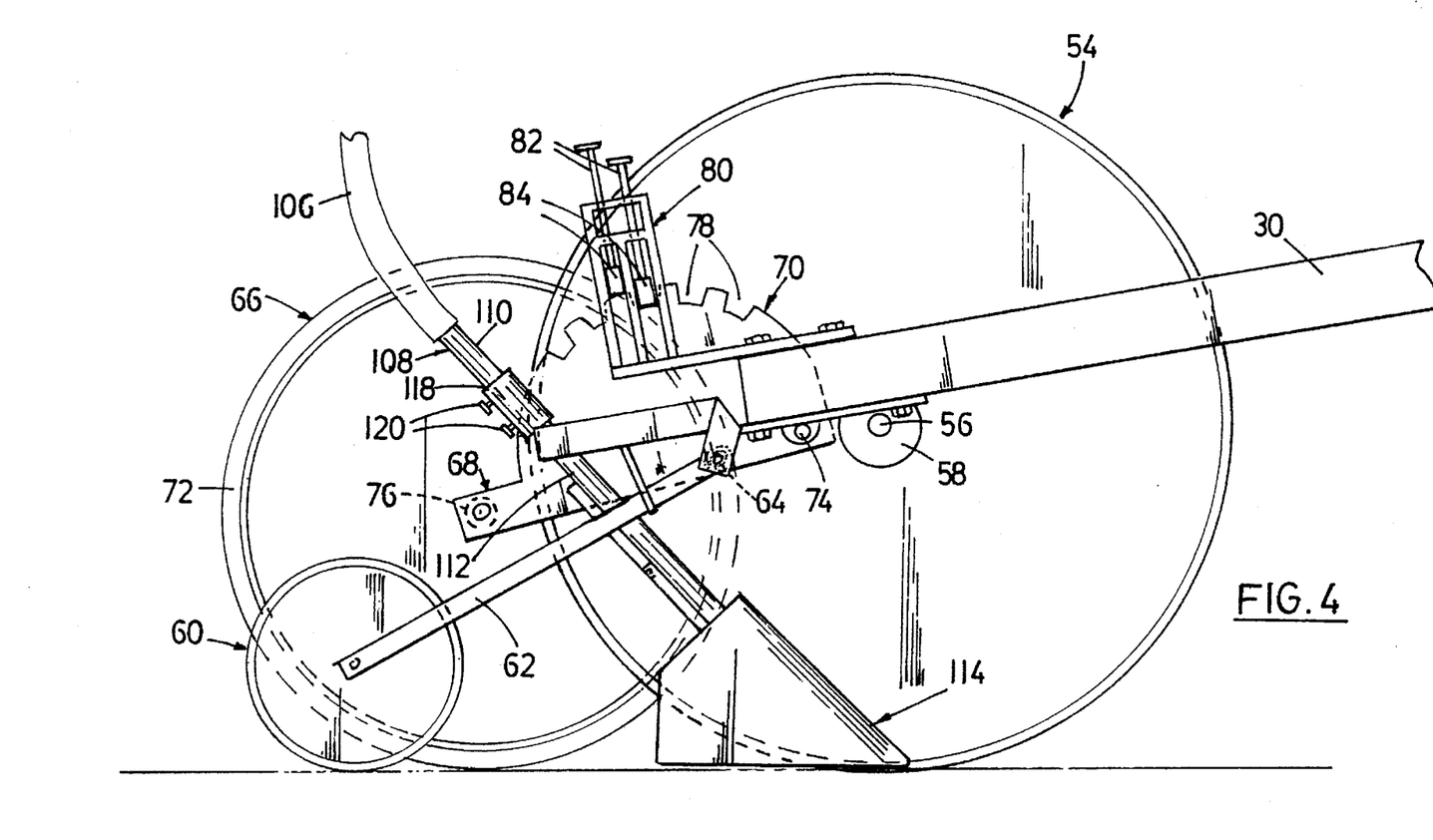
FIG. 4 is a side view showing the major components of the apparatus of the invention.
Figure 4A:
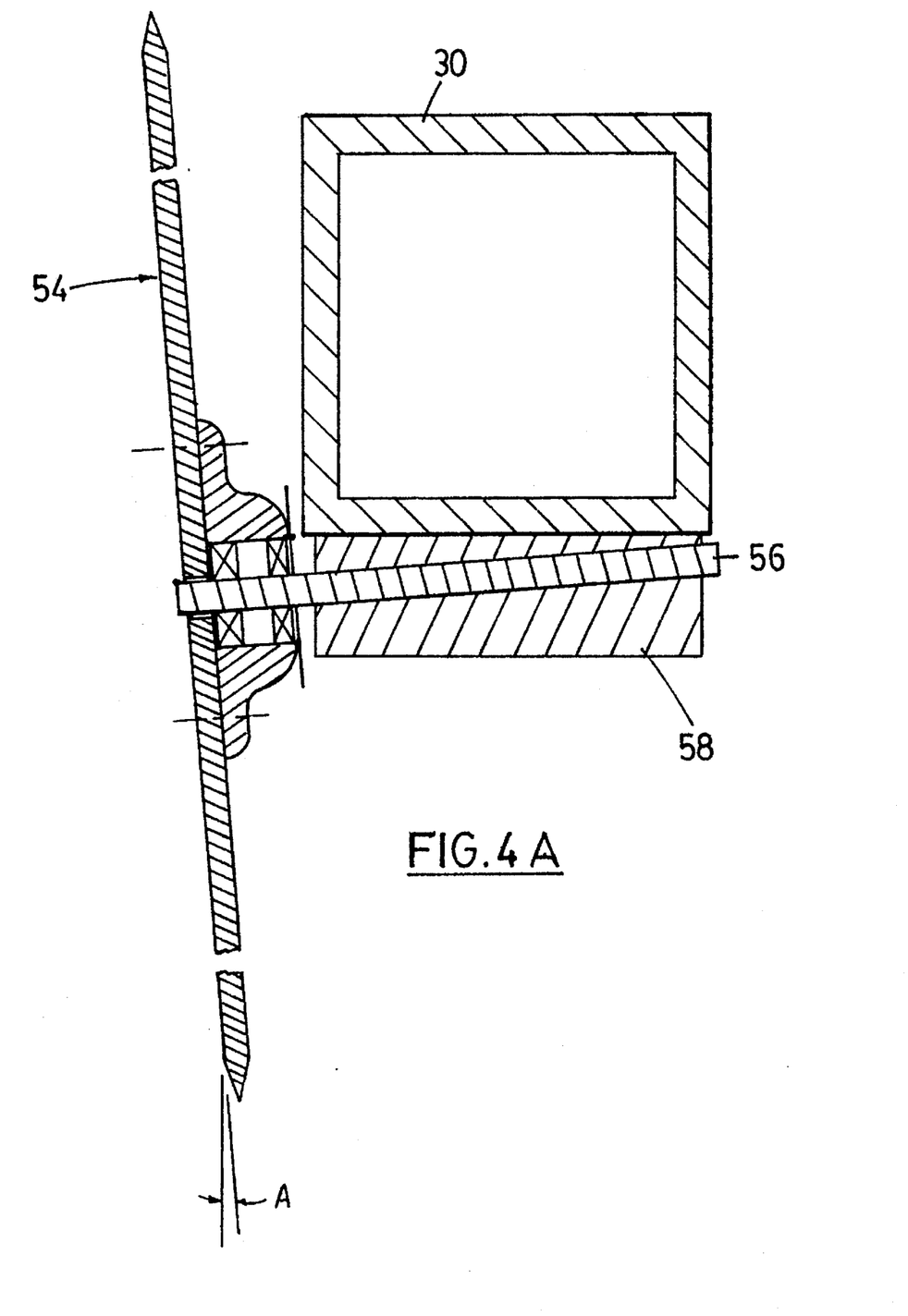
FIG. 4A is a partial cross-section normal to the mounting arm through the disc wheel hub.

The rearward end of the arm 30 mounts several circular disc members thereto. A large diameter, thin disc wheel 54, sharpened on both sides thereof, is bearingly mounted to shaft 56 held in retainer means 58 fixed to the rearward end of the arm 30. As seen in FIGS. 4A and 4 the retainer means 58 is oriented so that the disc wheel 54 is mounted at a slight angle "A" (about 5°) to the vertical and at a slight angle "B" (about 5°) to the direction of travel of the apparatus. Adjacent air drill assemblies on the leading implement bar 16 will have their disc wheels angled parallel to each other. However, The air drill assemblies mounted to the trailing implement bar 18 will have their disc wheels angled relative to the direction of travel oppositely to those of the air drill assemblies mounted to the leading implement bar, all for tracking purposes. Furthermore, trailing air drill assemblies will be offset laterally from the leading air drill assemblies, each of the leading and trailing air drill assemblies being adapted to plant seed in a separate row or furrow.

A small diameter seed lock wheel 60 is journaled to a trailing arm 62 pivotally mounted to the arm 30. The wheel 60 is moulded from a plastics material so that there is no build-up of earth or other material thereof in wet conditions. The trailing arm 62 is biased downwardly by torsion spring 64 acting between the trailing arm 62 and the mounting arm 30. The seed lock wheel 60 closely follows the disc wheel 54 and is laterally offset therefrom by a very small distance.

An adjustable depth control wheel 66 is journaled to one end of a journal member 68, having an upwardly arcuate portion 70 thereon, on the side of the disc wheel 54 opposite the seed lock wheel 60. The wheel 66 is also moulded from a plastics material and includes a replaceable outer rim 72 of a rubber material. The opposite end of the journal member 68 is mounted to a separate shaft 74 journaled to the arm 30 at a slight angle to the disc wheel 54 so that the rubber rim 72 thereof will almost rub against the disc wheel 54, thereby serving to remove mud and other earthen debris from the disc wheel 54 as it rotates. The wheel 66 includes a metal hub 76 with a replaceable roller bearing (not shown) therein.

The depth control wheel is adjustable so as to control the depth that the disc wheel 54 penetrates the earth, thereby controlling the depth of furrow in which seed will be planted. The arcuate portion 70 of the journal member 68 has a plurality of rectangular notches 78 in the upper edge thereof, the notches having a width of about ¾". The arcuate portion 70 passes adjacent an upwardly extending housing 80 secured to the rearward upper surface of the arm 30 at an angle to the arm so that it is parallel to the arcuate portion 70. A pair of rods 82 extend upwardly from within the housing 80, through the upper wall thereof, each rod being connected to a laterally extending latch member or lug 84 of about ¾" in width. Each of the lugs is receivable in each notch 78 to hold the arcuate portion 70 in any one of a plurality of adjusted positions. Adjustment is achieved by raising the rods 82, moving the journal member 68 and the depth control wheel 66 to the desired position, and then returning the appropriate lug into the notch adjacent thereto to hold the journal member 68 in position. The lug 84 that is not positioned in a notch will rest on the edge of the arcuate portion 70 between adjacent notches. By using two laterally offset lugs 84 it is possible to maintain the strength of the arcuate portion with wide spacing of the notches while achieving small adjustment increments.

Seed is directed to the air drill assemblies of the present invention as follows. Each of the implement bars includes several vertical posts 86, each post 86 being surmounted by a plastic seed distributor 88, each distributor 88 feeding seed, fertilizer, insecticide, and/or herbicide from the container means 26 to a plurality of air drill assemblies 28. Each distributor 88 (FIG. 5) includes a cylindrical housing 90 with an inlet 92 in the frustoconical bottom wall 94 thereof. The inlet is connected by flexible hose 96 to the container means 26. The housing wall 98 includes a plurality of equally circumferentially spaced outlets 100. A removable top member 102 has a downwardly domed bottom wall 104 against which seed or other material is driven by air pressure generated at the container means 26. The downwardly domed wall 104 redirects the seed or other material through about 90° towards the outlets 100.

Figure 5:
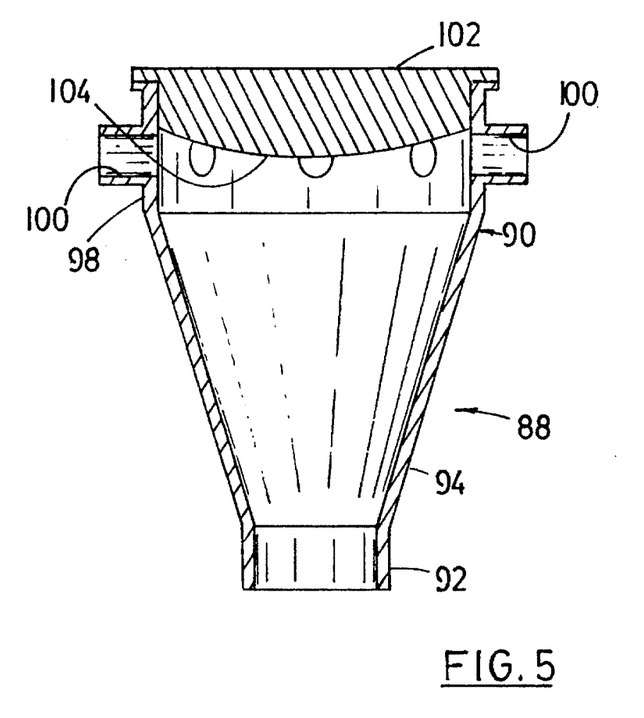
FIG. 5 is a vertical cross-section of the seed distributor as used with the present invention.

For ease of manufacture the post 96 may be in the form of a tube, with the inlet 92 to the distributor 88 being directly connected to the tubular post. The flexible hose 96 would then be connected to the inlet to the tubular post, rather than to the inlet 92 to the distributor 88.

Each outlet 100 is connected by a flexible hose 106 to seed boot means 108 mounted at each air drill assembly 28. The seed boot means 108 (FIG. 6) includes a hollow tube 110 which is adjustably mounted to the arm 30 and preferably has an S-bend 112 in the middle so that the lower end portion of the tube is located closely adjacent the disc wheel 54 at the rear thereof. The tube 110 is reinforced by a rectangular bar 111 welded thereto along a portion of its length. The upper end of the tube receives the flexible hose 106 and thus is connected to the distributor 88 and then to the container means 26.

Figure 6:
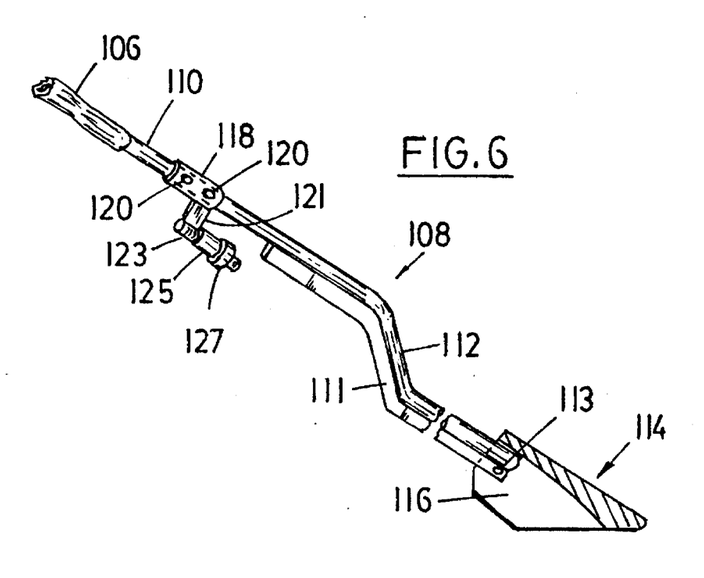
FIG. 6 is a partial vertical cross-section of the seed boot used with the present invention.
Figure 7:
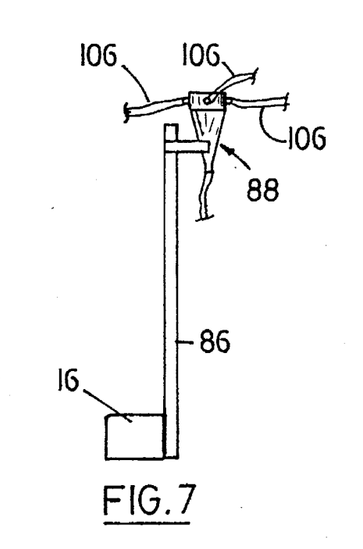
FIG. 7 shows an end view of an implement bar mounting a seed distributor thereto.

The lower end of the tube 110 is bolted, as at 113, to a triangular seed boot 114 which has a slot 116 therein leading from the lower opening of the tube 110 and turning through an appropriate angle sufficient to redirect seed or other material downwardly towards the ground. The upper portion of the tube 110 fits in a hollow sleeve 118 that has a pair of set screws 120 therein bearing against the tube 110 to hold it in position relative to the disc wheel 54. The set screws 120 can be loosened to permit vertical adjustment of the tube 110 and then retightened to secure the tube 110 in its new position. A lug 121 is welded to the sleeve and a threaded rod 123 is welded to the outer end of the lug. The rod 123 has a sliding fit in another sleeve 125 which is welded to the arm 30 or an extension thereof. A threaded nut 127 engages the rod 123 and bears against the sleeve 127 to provided a further adjustment for the seed boot tube 110.

Figure 2A:
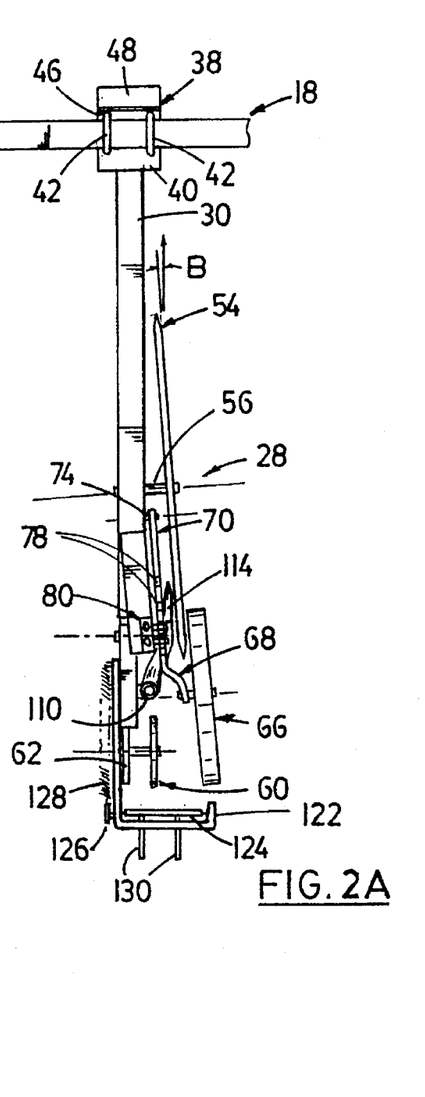
FIG. 2A is a plan view of a second form of the apparatus of the invention.

The trailing air drill assemblies (FIG. 2A) differ slightly from the leading air drill assemblies by including a generally squared J or L-shaped mounting bar 122 that in turn mounts a spring-loaded shaft 124. The shaft 124 has a lever arm 126 at one end and a spring 128 extends between the lever arm and the mounting arm so as to bias the shaft 124 in one direction. The shaft carries a pair of spaced-apart elongated rods 130, one of which follows the trailing disc wheel, the other of which is laterally offset enough to follow the leading disc wheel. The rods 130 are intended to close the furrows after seed has been deposited therein.

The operation of the present invention is very straightforward. After determining the depth to which the seed or other particulate material is to be deposited into the ground the operator adjusts the depth control wheel 66 of each air drill assembly 28 so that the disc wheel means 54 thereof will penetrate the earth to the desired depth. The operator then pulls the implement bars and the following container means over the field to be planted so that the disc wheels will each cut a thin furrow of the desired depth in the ground. As this is happening seeds or other particulate material are driven by air pressure from the container means 26 along the flexible hoses 96 to the distributors 88 from which they are directed to the individual tubes 110 and then are driven into the ground by air pressure. The following seed lock wheels 60 tamp the seeds or other particulate material firmly into the ground and the rods 130 on the trailing assemblies close the ground of the furrows over the seed or other particulate material, thereby completing the planting process.

The foregoing has described the present invention as it would typically be used. In a most basic embodiment there could be but a single air drill assembly 28 mounted to a single implement mounting bar 18 being towed behind a tractor. Although this would not be particularly efficient such a configuration might be used for a small market garden. In such a configuration, or if a plurality of air drill assemblies are mounted to only a single implement mounting bar then each such assembly should carry a furrow closing rod 130 thereon.

It is understood that other changes could be made to the apparatus of the present invention without departing significantly from the spirit of the invention. Accordingly the protection to be afforded this invention is to be determined from the scope of the claims appended hereto.

I claim:

1. Air drill apparatus for towing behind a tractor and for placing particulate material in the ground, comprising:

wheeled implement means adapted to be towed behind the tractor, said implement means including at least one transversely extending implement mounting bar;

at least one air drill assembly mounted to said implement mounting bar; and container means for the particulate material to be placed in the ground, said container means including means for creating a positive air pressure to drive particulate material therefrom to said air drill assembly;

said air drill assembly comprising:

an elongated arm pivotally connected to said mounting bar;

a single thin, circumferentially sharp disc wheel rotatably mounted to said arm at a slight angle to the vertical and at a slight angle to the direction of travel for cutting a narrow furrow in the ground;

seed boot means connected to said container means and mounted to said arm adjacent said disc wheel and the ground for depositing particulate material in said furrow;

seed lock wheel means mounted to said arm adjacent and behind said disc wheel for pushing deposited seed or other particulate material deeper into said furrow; and a single adjustable depth control wheel for controlling the depth of furrow cut by said disc wheel, said depth control wheel means being rotatably mounted to one end of a journal member the other end of which is rotatably mounted to said arm, said journal member including, extending upwardly therefrom, an arcuate portion having a series of equally spaced apart notches therein, said arm carrying a housing with at least one reciprocable latch member therein, said latch member being engageable with a selected one of said notches to adjust the position of said depth control wheel relative to said disc wheel.

2. The apparatus of claim 1 wherein tension spring means are connected between a forward extension of said arm and said implement bar in order to exert a downwardly directed force on said disc wheel.

3. The apparatus of claim 2 wherein said seed boot means includes a tube adjustably mounted to said arm, flexible hose means extending from an upper end of said tube to said container means, and a deflector boot at the lower end of said tube for deflecting seed downwardly into said furrow.

4. The apparatus of claim 3 wherein said seed lock wheel means is formed from a plastics material and is spring biased in a downwards direction to firmly push deposited seed or other particular material into the furrow created by said disc wheel.

5. The apparatus of claim 4 wherein said depth control wheel includes a solid wheel member, a resilient wear resistant rim member, and means mounting the wheel member to said journal member adjacent and at an angle with respect to said disc wheel whereby said resilient rim member may contact said disc wheel to remove dirt and debris therefrom.

6. The apparatus of claim 3 wherein said implement means includes at least leading and trailing implement bars spaced apart in the direction of travel, each of said implement bars mounting at least one air drill assembly thereon, with the air drill assembly mounted to the leading implement bar being laterally offset from the air drill assembly mounted to the trailing implement bar.

7. The apparatus of claim 6 wherein the mounting angle relative to the direction of travel for the disc wheel of the air drill assembly mounted to the leading implement bar is opposite to the mounting angle relative to the direction of travel for the disc wheel means of the air drill assembly mounted to the trailing implement bar.

8. The apparatus of claim 7 including a plurality of spaced apart air drill assemblies mounted to each of said leading and trailing implement bars.

9. The apparatus of claim 8 including seed distributor means on said implement means and connected directly to said container means, each of the seed boot means of said plurality of air drill assemblies being connected to said seed distributor means.

10. The apparatus of claim 9 wherein said seed distributor means comprises: a generally cylindrical housing having a seed inlet in a frustoconical bottom wall thereof; a plurality of circumferentially spaced apart seed outlets in a side wall of said housing, each of which is connected to corresponding seed boot means; and a downwardly domed top wall for said housing for directing seeds fed thereto under air pressure to said seed outlets.

11. The apparatus of claim 10 including separate seed distributor means for each of said plurality of air drill assemblies.

12. Air drill apparatus for towing behind a tractor and for placing particulate material in the ground, comprising:

leading and trailing wheeled implement mounting bars adapted to be towed behind the tractor;

a plurality of leading air drill assemblies mounted to said leading implement mounting bar;

a plurality of trailing air drill assemblies mounted to said trailing implement mounting bar; and container means for the particulate material to be placed in the ground, said container means including means for creating a positive air pressure to drive particulate material therefrom to said air drill assemblies;

each said air drill assembly comprising:

an L-shaped mounting bracket having a horizontal leg thereof secured to one of the implement mounting bars and a vertical leg thereof extending upwardly in front of the one implement mounting bar;

a mounting arm pivotally connected to said mounting bracket;

tension spring means connected between the front end of said mounting arm and the upper end of said vertical leg of said bracket;

a single thin, circumferentially sharp disc wheel rotatably mounted to said mounting arm at a slight angle to the vertical and at a slight angle to the direction of travel of said apparatus for cutting a narrow furrow in the ground;

a hollow tube member mounted to said mounting arm, an upper end thereof being connected to said container means and the lower end thereof carrying a seed boot positioned closely adjacent said disc wheel and the ground for depositing particulate material in said furrow;

a seed lock wheel mounted to said mounting arm adjacent and behind said single disc wheel for pushing deposited particulate material deeper into said furrow; and a single adjustable depth control wheel for controlling the depth of furrow cut by said single disc wheel, said depth control wheel being rotatably mounted to one end of a journal member the other end of which is rotatably mounted to said arm, said journal member including, extending upwardly therefrom, an arcuate portion having a series of equally spaced apart notches therein, said arm carrying a housing with at least one reciprocable latch member therein, said latch member being engageable with a selected one of said notches to adjust the position of said depth control wheel relative to said single disc wheel.

13. The apparatus of claim 12 wherein the mounting angles relative to the direction of travel for the disc wheel of the air drill assemblies mounted to the leading implement bar are opposite to the mounting angles relative to the direction of travel for the disc wheel of the air drill assemblies mounted to the trailing implement bar.

14. The apparatus of claim 13 wherein said depth control wheel includes a sold wheel member, a resilient wear resistant rim member, and means mounting the wheel member to said journal member adjacent and at an angle with respect to said disc wheel whereby said resilient rim member may contact said disc wheel to remove dirt and debris therefrom.

15. The apparatus of claim 12 including distributor means on said each of said implement bars and connected directly to said container means, each of the tube members of said plurality of air drill assemblies being connected to said distributor means.

16. The apparatus of claim 15 wherein said distributor means comprises: a generally cylindrical housing having an inlet in a frustoconical bottom wall thereof; a plurality of circumferentially spaced apart outlets in a side wall of said housing, each of which is connected to a corresponding tube member; and a downwardly domed top wall for said housing for directing particulate material fed thereto under air pressure to said outlets.

17. The apparatus of claim 16 including separate distributor means for each of said plurality of air drill assemblies.

* * * * *